United States Patent

Hager et al.

[11] Patent Number: 5,899,413
[45] Date of Patent: May 4, 1999

[54] NON-WAISTED FUSELAGE DESIGN FOR SUPERSONIC AIRCRAFT

[75] Inventors: James O. Hager, Long Beach; Shreekant Agrawal, Rancho Santa Margarita; Dhamanshu L. Antani, Anaheim, all of Calif.

[73] Assignee: McDonnell Douglas Corporation, St. Louis, Miss.

[21] Appl. No.: 08/980,966

[22] Filed: Dec. 1, 1997

[51] Int. Cl.$^6$ ....................................................... B64C 1/38
[52] U.S. Cl. ........................................... 244/130; 244/119
[58] Field of Search ............................... 244/117 R, 119, 244/130; 29/890.01

[56] References Cited

U.S. PATENT DOCUMENTS

2,874,922   2/1959   Whitcomb ................................ 244/130

Primary Examiner—Charles T. Jordan
Assistant Examiner—Charles R. Ducker, Jr.
Attorney, Agent, or Firm—Westerlund & Powell, P.C.; Robert A. Westerlund; Raymond H.J. Powell, Jr.

[57] ABSTRACT

A method for designing a non-waisted fuselage for supersonic wing/fuselage configurations that increases the fuselage volume and improves the supersonic aerodynamic performance compared to a conventional waisted-fuselage configuration. The method entails removing the waisted region of an existing waisted-fuselage configuration by linearly reconstructing cross-sections between the endpoints representing the waisted cross-sectional area portion to create a modified fuselage configuration without waisting. This configuration will have increased fuselage volume and improved supersonic aerodynamic performance. The fuselage camber can then be optimized using non-linear aerodynamic methods to further increase the supersonic aerodynamic performance.

13 Claims, 11 Drawing Sheets

NON-WAISTED FUSELAGE DESIGN FOR SUPERSONIC AIRCRAFT

This invention was made under Contract No. NAS1-20220 awarded by NASA. The Government has certain rights to this invention.

BACKGROUND OF THE INVENTION

The supersonic wave drag of an aircraft is dependent upon the cross-sectional area distribution of the fuselage and wing together. Traditional supersonic aircraft employ a concept known as area-ruling to reduce drag. In area-ruling, the fuselage is often indented or "waisted" at the wing-root location to achieve a smooth combined wing/fuselage cross-sectional area distribution.

The area-ruling method is based on the well-known supersonic slender body (linear) theory. It can be assumed that at large distances from the body, the disturbances are independent of the arrangement of the components of the body, and are only a function of the cross-sectional area distribution. This means that the drag of a wing-fuselage combination can be calculated as though the combination were a body of revolution with an equivalent cross-sectional area.

It is a generally accepted practice among airframe designers that area-ruling must be used to obtain the most desirable configuration to achieve a low supersonic wave drag for a particular Mach number. As stated previously, in order to achieve a smooth cross-sectional area distribution and to minimize the total cross-sectional area, the most common technique is to "indent" the fuselage enough to permit the wing to be added without sharp discontinuities appearing on the cross-sectional area distribution of the configuration.

Figure 1A:
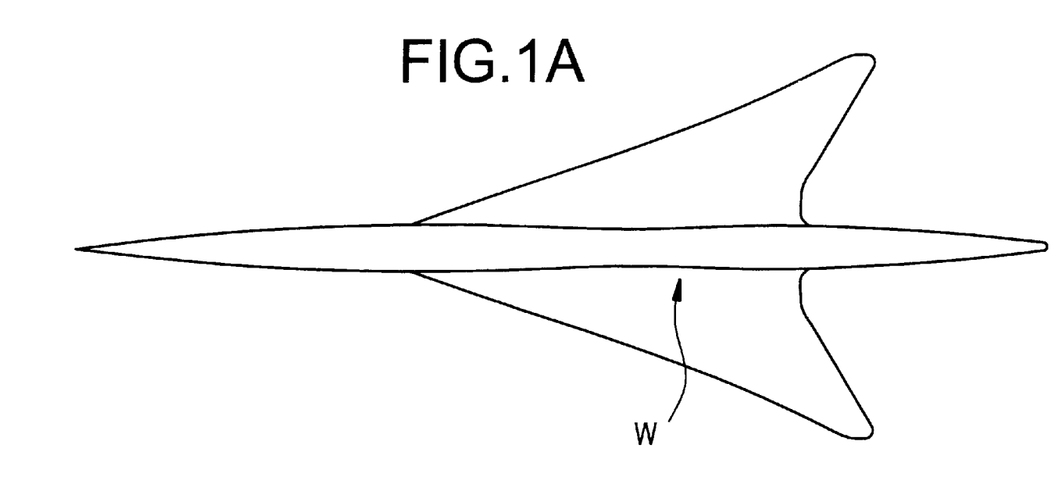
FIG. 1A is a top view of a wing/fuselage configuration with a waisted fuselage in accordance with a conventional design.
Figure 1B:
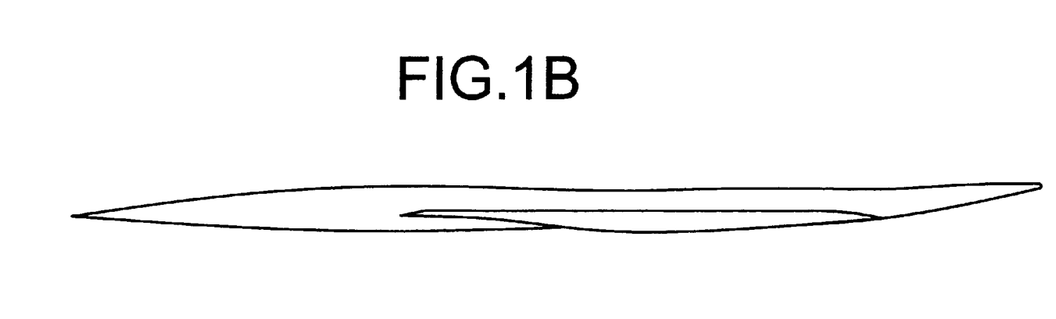
FIG. 1B is a side view of a wing/fuselage configuration with a waisted fuselage in accordance with a conventional design.

FIGS. 1A and 1B show the top and side views, respectively, of a waisted fuselage shape of a traditional supersonic transport aircraft that was designed using linear-theory area-ruling in the presence of the wing. This particular configuration was designed to cruise supersonically at $M_\infty=2.4$. The top view in FIG. 1A most clearly shows the waisting, 'W', of the fuselage in the wing-root region.

Such fuselage "waisting", however, reduces the useable fuselage volume which could be used for either seating additional passengers or carrying additional payload. In addition, the waisting introduces challenges for the fuselage interior layout because the fuselage shape is not constant.

Accordingly, there exists a need for a method for designing a fuselage that does not have a waist, but which still has good supersonic aerodynamic performance. By removing the fuselage waist, and performing optimization using non-linear aerodynamic methods, a configuration with more fuselage volume can be obtained that has increased supersonic aerodynamic performance compared to a traditional supersonic configuration.

SUMMARY OF THE INVENTION

The present invention is therefore directed to a design method which substantially overcomes one or more of the problems due to the limitations and disadvantages of the conventional art.

In general, the present invention is a departure from the conventional view that a supersonic aircraft design must have an area-ruled fuselage with a waist in the wing-root region. The present invention allows the fuselage waist to be removed without incurring additional drag, while increasing the useable volume of the fuselage that can be used for additional payload. Moreover, by careful application of a non-linear design method, the supersonic cruise drag can be reduced even further, thus producing improved supersonic aerodynamic performance.

To achieve these and other advantages, the present invention comprises a method of designing a non-waisted fuselage for a supersonic wing/fuselage configuration. The method consists of the following five steps: (A) providing a baseline fuselage configuration having a waisted cross-sectional area portion; (B) designating endpoints representing the waisted cross-sectional area portion; (C) removing the waisted cross-sectional area portion by linearly reconstructing cross-sections between the endpoints to produce a modified fuselage configuration without waisting; (D) recovering a fuselage camber line of the baseline fuselage configuration to produce the same fuselage camber line for the modified fuselage configuration; and (E) optimizing the fuselage camber line of the modified fuselage configuration to produce an optimized fuselage configuration to maximize supersonic aerodynamic performance.

The method may be stopped after step (D), in which case the resulting modified configuration will still have increased fuselage volume and improved aerodynamic performance. However, when the optimization step (E) is carried out using non-linear aerodynamic methods, the supersonic aerodynamic performance of the resulting optimized configuration can be further increased.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF THE INVENTION

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility.

The present invention is described and illustrated with regard to a representative linear-theory-designed configuration. The present invention may be utilized with other configurations, although they are not presented here. One of ordinary skill in the art could readily utilize the method of the present invention to determine the applicability to other configurations without undue experimentation.

In the following discussion, the conventional waisted design is referred to as the Linear-Theory Baseline, or simply, Baseline design. The Modified and Optimized designs refer to the embodiments of the present inventive method.

Figure 2:
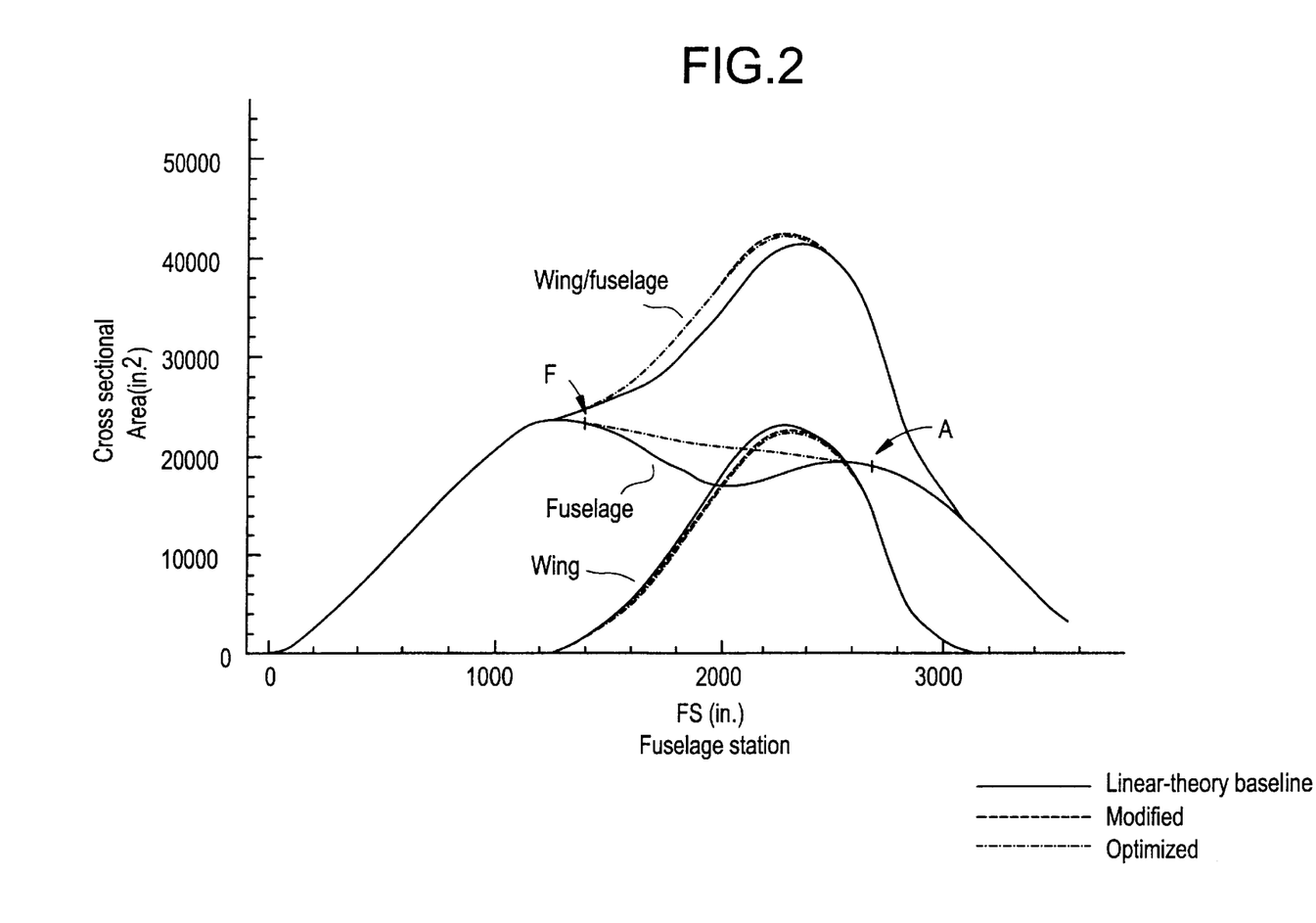
FIG. 2 is a graph showing the $M_\infty=1.0$-cut area (standard cross-sectional area) distributions of a conventional Baseline design, compared to Modified and Optimized designs in accordance with the present invention.
Figure 3:
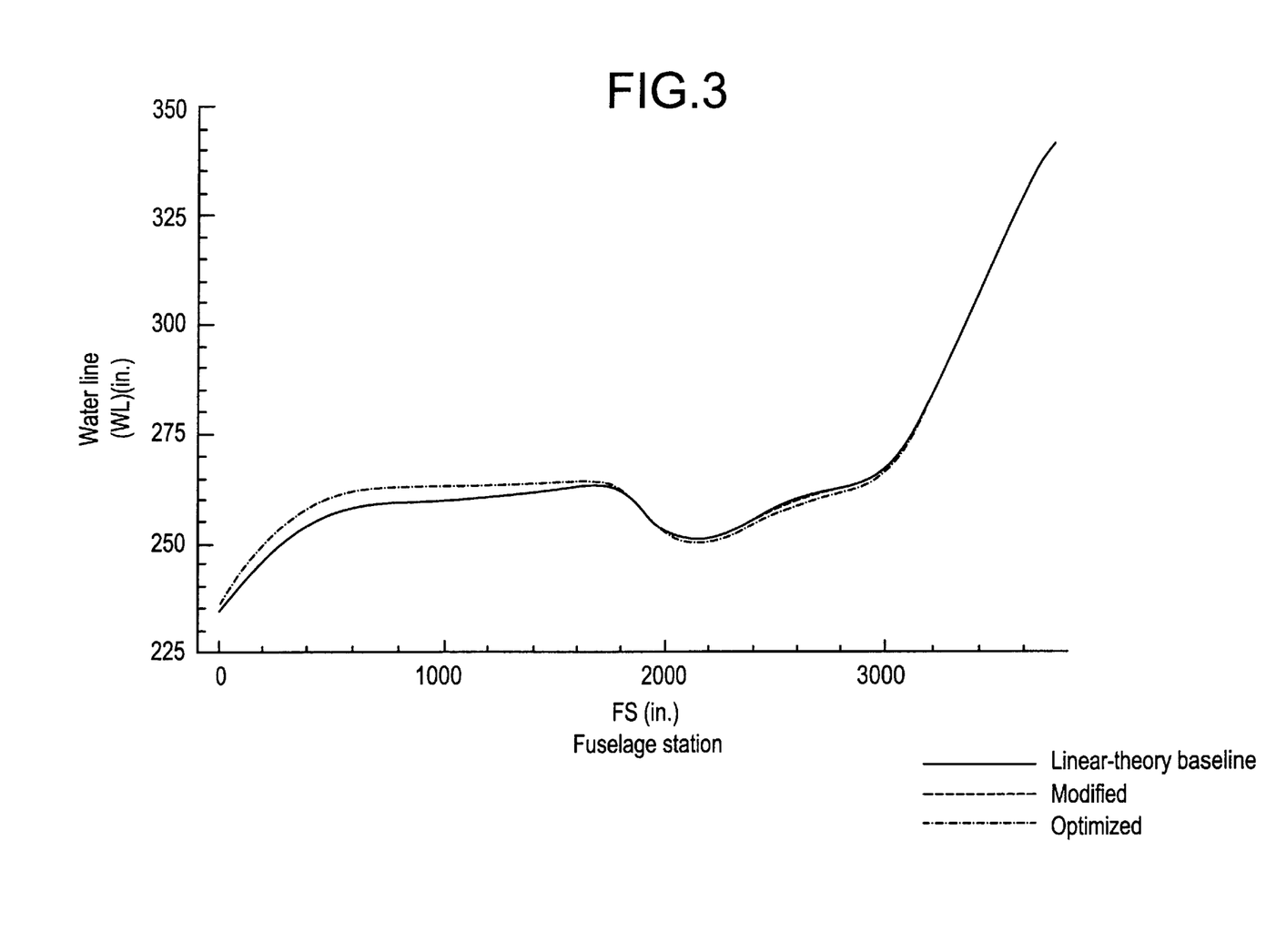
FIG. 3 is a graph showing the fuselage camber lines of the Baseline, Modified and Optimized designs of FIG. 2.

FIG. 2 is a graph illustrating the M∞=1.0-cut area (standard cross-sectional area, in.$^2$) distribution along the fuselage station (FS) (in.) of each of the Baseline, Modified and Optimized designs for the wing, fuselage and wing/fuselage combination. Note the distinctive waisting (reduced cross-sectional area) for the Baseline fuselage. FIG. 3 is graph of the fuselage camber line as a function of the fuselage station for the Baseline, Modified and Optimized designs. The fuselage camber line is the locus of points, measured in waterline (WL) (in.), halfway between the crown (upper surface) and keel (lower surface) at a constant fuselage station.

The first general part of the method of the present invention is to remove the fuselage waisting 'W' for an exemplary conventional supersonic aircraft such as shown in FIG. 1A. The waisting is removed by linearly reconstructing the fuselage cross-sections between a designated endpoint 'F' corresponding to a fuselage station just forward of the waisted portion and a designated endpoint 'A' corresponding to a fuselage section just aft of the waisted portion. Referring to FIG. 2, these endpoints of the waisted portion are at approximately FS1400 and FS2700. This linear reconstruction essentially produces a linear variation in the fuselage cross-sectional area between the endpoints 'F' and 'A'.

After the waisting is removed, the fuselage camber line of the Baseline configuration is then re-imposed or recovered as shown in FIG. 3 to provide the same camber line for the Modified fuselage. Note that in FIG. 3 the Baseline and Modified fuselage camber lines thus overlap after the recovery step. The resulting configuration at this stage of the present invention is referred to as the Modified wing/fuselage configuration. The top and side views of the Modified configuration are shown in FIG. 4A and 4B respectively.

Figure 4A:
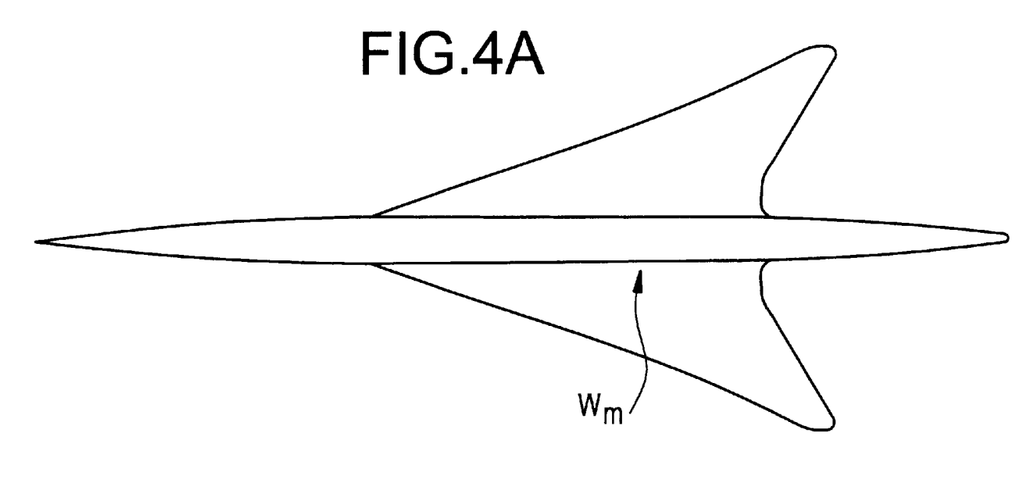
FIG. 4A is a top view of a wing/fuselage configuration with a Modified non-waisted fuselage in accordance with the present invention.
Figure 4B:
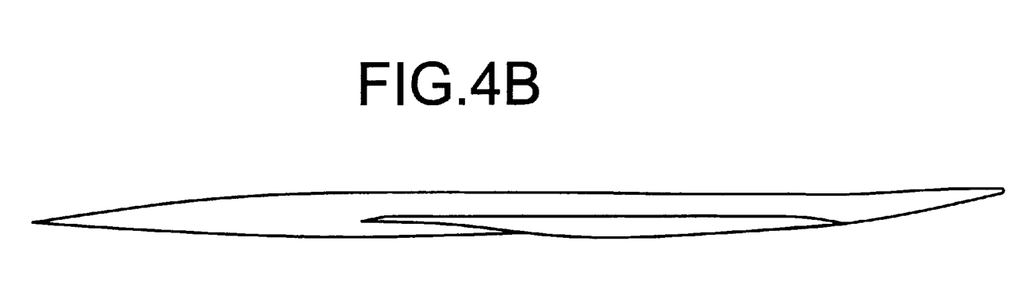
FIG. 4B is a side view of a wing/fuselage configuration with a Modified non-waisted fuselage in accordance with the present invention.

FIG. 4A clearly shows the increased fuselage volume that results from removing the waisting, '$W_M$', of this Modified configuration compared to the Baseline fuselage in FIG. 1A.

Figure 5:
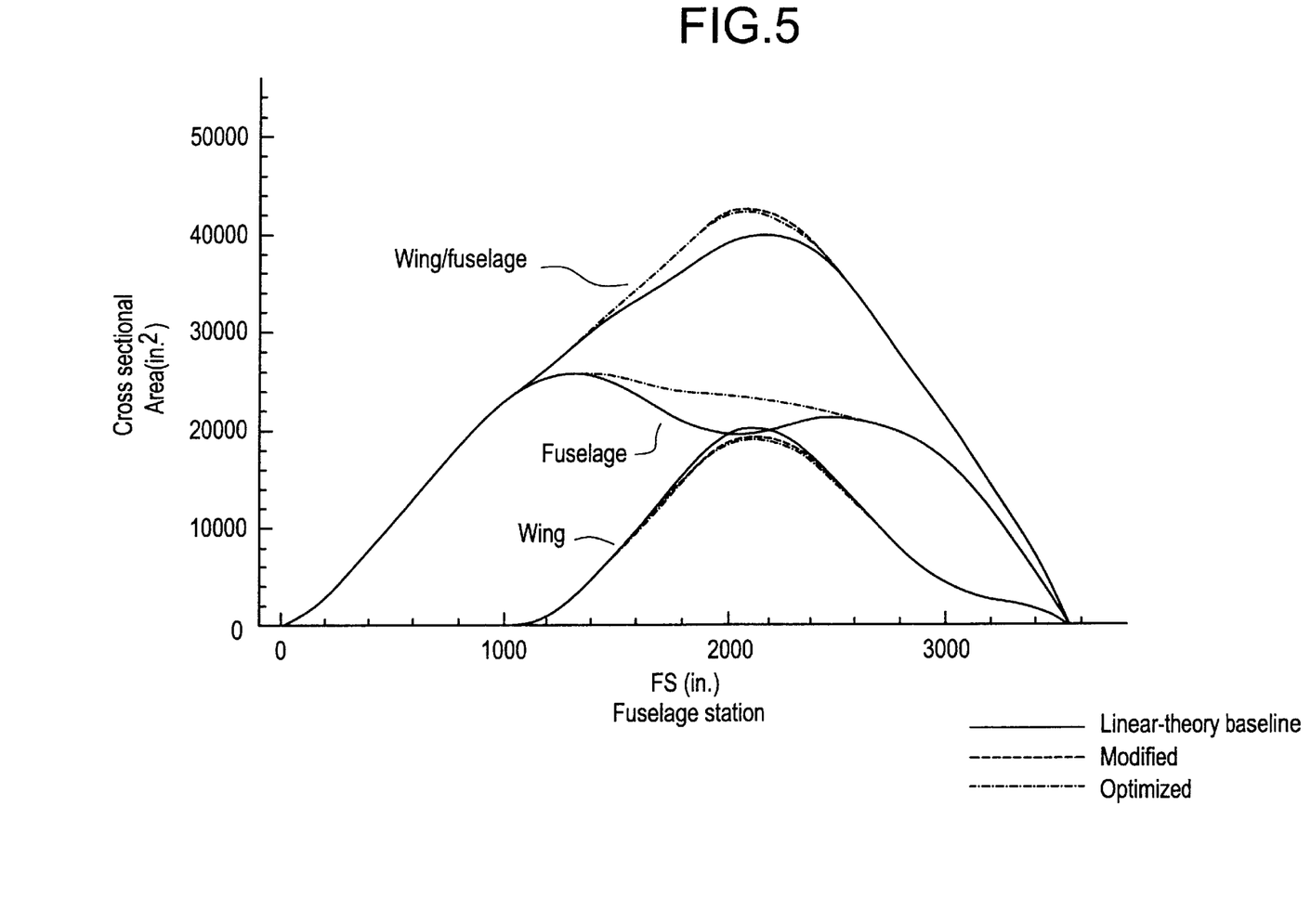
FIG. 5 is a graph showing the $M_\infty=2.4$-cut area distributions of the Baseline, Modified and Optimized designs.

FIG. 5 is a graph showing the $M_\infty$=2.4-cut area distributions of the Baseline, Modified and Optimized designs along the fuselage stations. The $M_\infty$=2.4 area cuts show that removing the fuselage waist does increase the total cross-sectional area for the Modified design as expected, but that the cross-sectional area distribution remains smooth.

Figure 6:
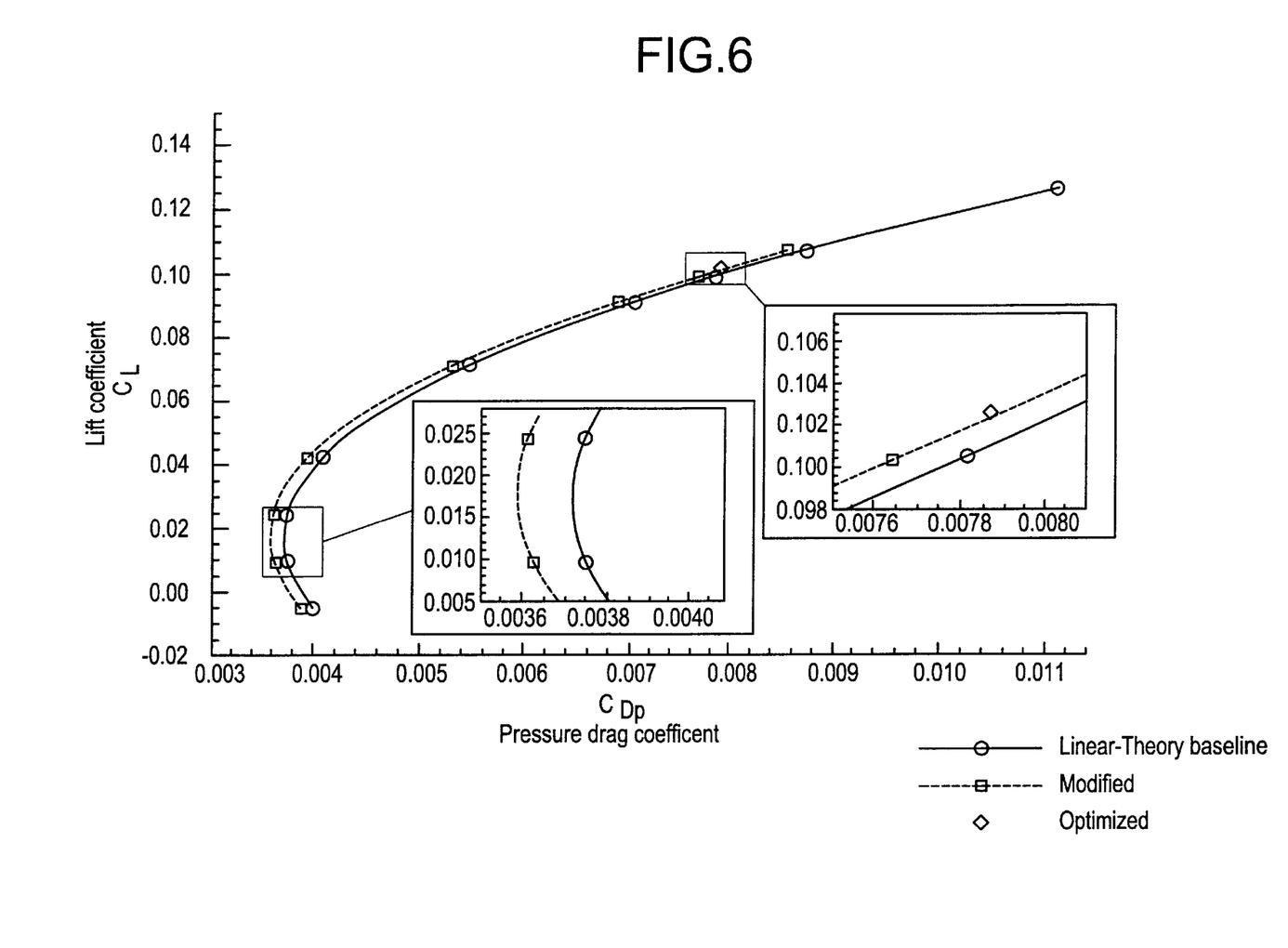
FIG. 6 is a graph showing the aerodynamic performance ($C_L$ vs. $C_{DP}$) of the Baseline, Modified and Optimized designs at $M_\infty=2.4$ as predicted by CFL3D in the Euler mode.

FIG. 6 is a graph showing the aerodynamic performance (lift coefficient ($C_L$) vs. pressure drag coefficient ($C_{Dp}$)) of the Baseline, Modified and Optimized designs at $M_\infty$=2.4 as predicted by CFL3D in the Euler mode. CFL3D is a computational fluid dynamics package readily available from the NASA Langley Research Center. FIG. 6 shows that the Modified configuration has 1.5 counts less pressure drag ($\Delta C_{Dp}$=-0.00015), about a 2% reduction at the supersonic cruise point ($M_\infty$=2.4, $C_L$=0.102), compared to the Baseline configuration. The Modified configuration will also have less skin friction drag than the Baseline configuration due, in part, to the reduced wetted area.

Figure 7:
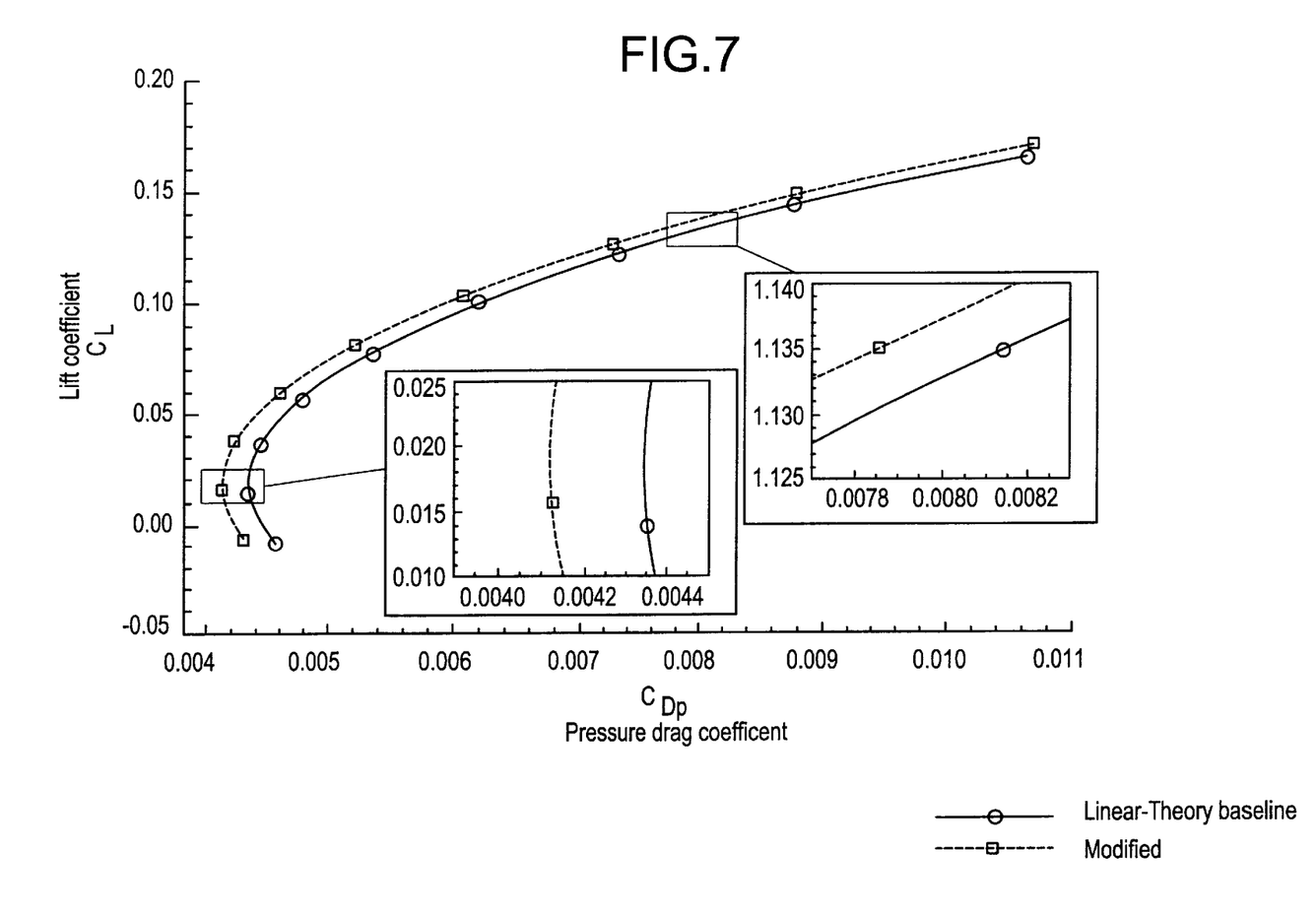
FIG. 7 is a graph showing the aerodynamic performance ($C_L$ vs. $C_{Dp}$) of the Baseline and Modified designs at $M_\infty=1.1$ as predicted by CFL3D in the Euler mode.

The off-design performance of the Modified design was also evaluated near $M_\infty$=1 where area-ruling is especially important. FIG. 7 is a graph showing the aerodynamic performance ($C_L$ vs. $C_{Dp}$) of the Baseline and Modified designs at $M_\infty$=1.1 as predicted by CFL3D in the Euler mode. At the thrust drag pinch-point ($M_\infty$=1.1, $C_L$=0.135), the Modified configuration has 2.9 counts less pressure drag ($\Delta C_{Dp}$=-0.00029) drag than the Baseline configuration.

Figure 8:
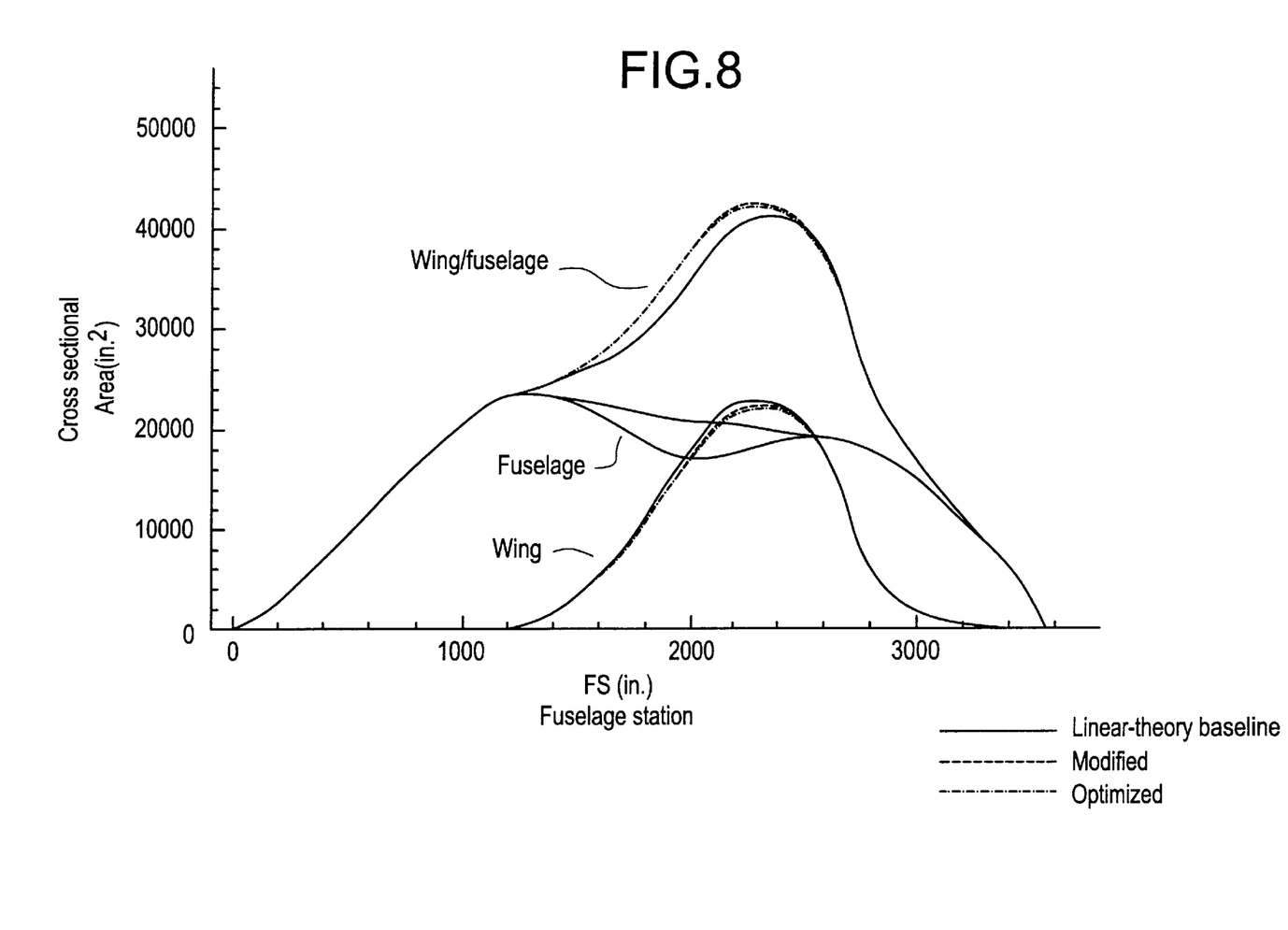
FIG. 8 is a graph showing the $M_\infty=1.1$-cut area distributions of the Baseline, Modified and Optimized designs.

FIG. 8 is a graph showing the $M_\infty$=1.1-cut area distributions of the Baseline, Modified and Optimized designs. Note that the Modified configuration has a smoother area distribution near FS1500 than the Baseline configuration, which has an inflection point in the curvature.

Figure 9:
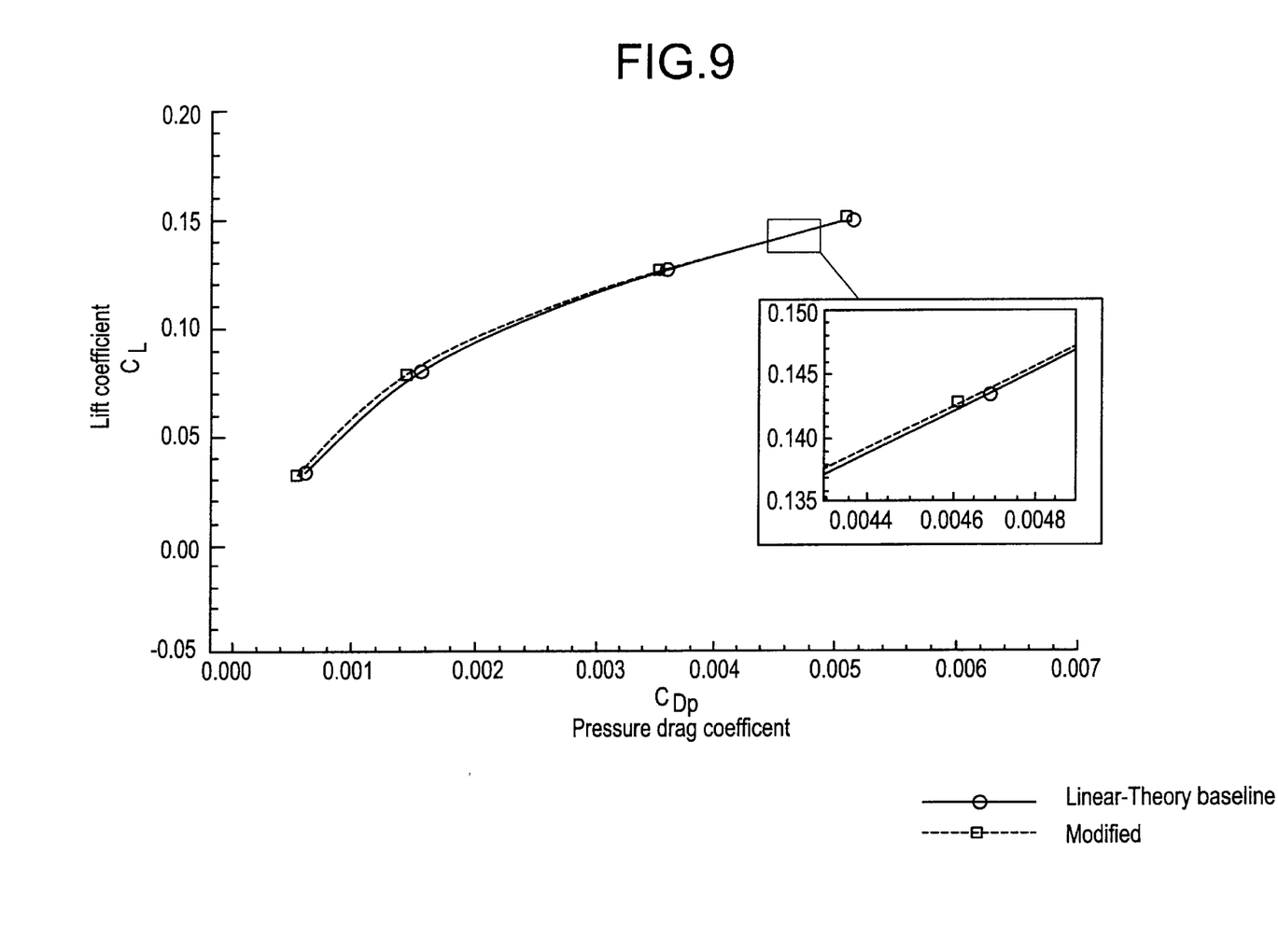
FIG. 9 is a graph showing the aerodynamic performance ($C_L$ vs. $C_{Dp}$) of the Baseline and Modified designs at $M_\infty=0.95$ as predicted by CFL3D in the Euler mode.

FIG. 9 is a graph showing the aerodynamic performance ($C_L$ vs. $C_{Dp}$) of the Baseline and Modified designs at $M_\infty$=0.95 as predicted by CFL3D in the Euler mode. At the subsonic cruise point ($M_\infty$=0.95, $C_L$=0.145), the Modified configuration has 0.2 counts less pressure drag ($\Delta C_{Dp}$=-0.00002) than the Baseline configuration. In addition to the enhanced supersonic aerodynamic performance at the supersonic cruise point (FIG. 6), FIGS. 7, 8 and 9 illustrate that the off-design aerodynamic performance is also desirably enhanced through the application of this invention.

After the fuselage waisting is removed as described above to produce a Modified configuration, in the second general part of the present invention, the fuselage of the Modified configuration is optimized, without changing the fuselage cross-sectional area, to maximize the supersonic aerodynamic performance. For optimizing, a commercially available design optimal tool (DOT) optimizer, available from VMA Engineering, is used with the method of feasible directions to allow constraints to be applied directly without penalty functions. There is one aerodynamic constraint: the lift coefficient, $C_L$, is allowed to vary ±2% during the optimization. There are several constraints on the deck placement, including: deck angle, cabin height, cargo height, and wing/deck clearance. There are two design variables for deck placement, one for wing plunge, nine for fuselage camber, one for fuselage incidence, and one for angle-of-attack.

Figure 10A:
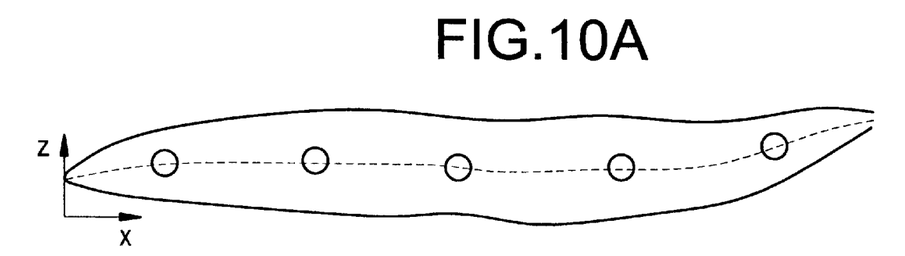
FIG. 10A is a schematic view of a fuselage.
Figure 10B:
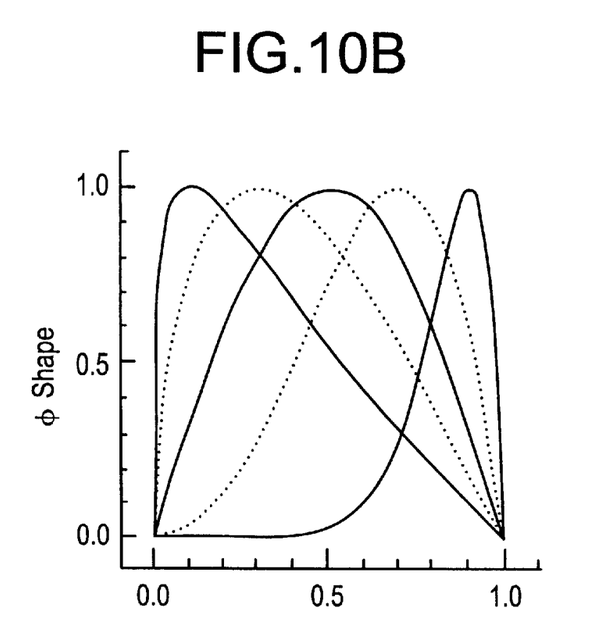
FIG. 10B is a graph showing five Hicks-Henne shape functions.

FIG. 10A shows a schematic view of a fuselage. The fuselage camber is changed by applying Hicks-Henne sine functions to perturb the reference geometry. FIG. 10B shows five Hicks-Henne sine functions used to perturb the entire length, l, of the fuselage. The vertical coordinate, z, of the reference fuselage $z_{ref}$, is changed by adding the shape function multiplied by the design variable, v, associated with that shape function, $\phi_{shape}$, according to the equation:

$$Z = Z_{ref} + \sigma V \phi_{shape} \quad (1)$$

The location of maximum displacement of each shape function is shown by the circles on the fuselage schematic in FIG. 10A.

Figure 11A:
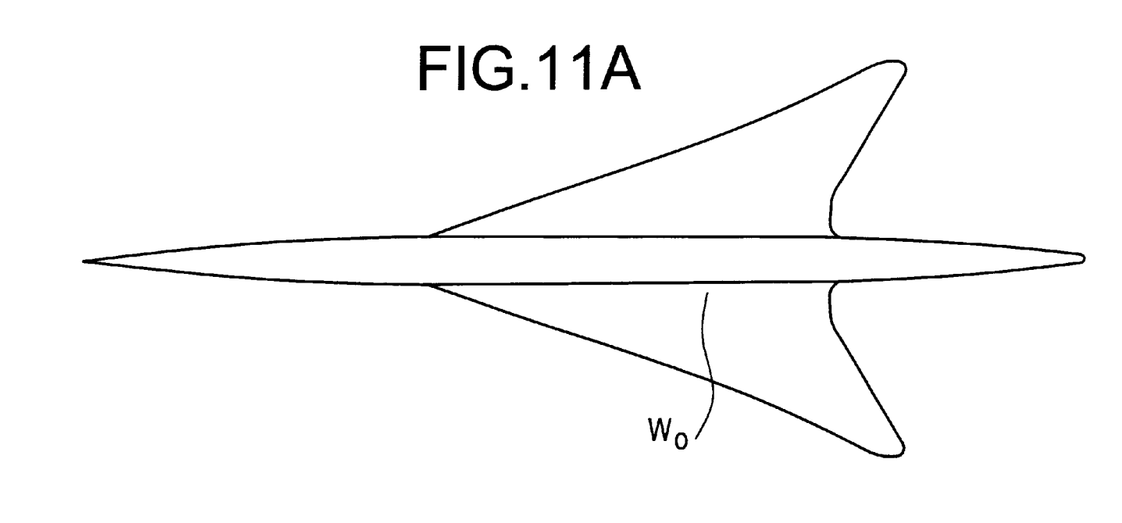
FIG. 11A is a top view of a wing/fuselage configuration with an Optimized non-waisted fuselage in accordance with the present invention.
Figure 11B:
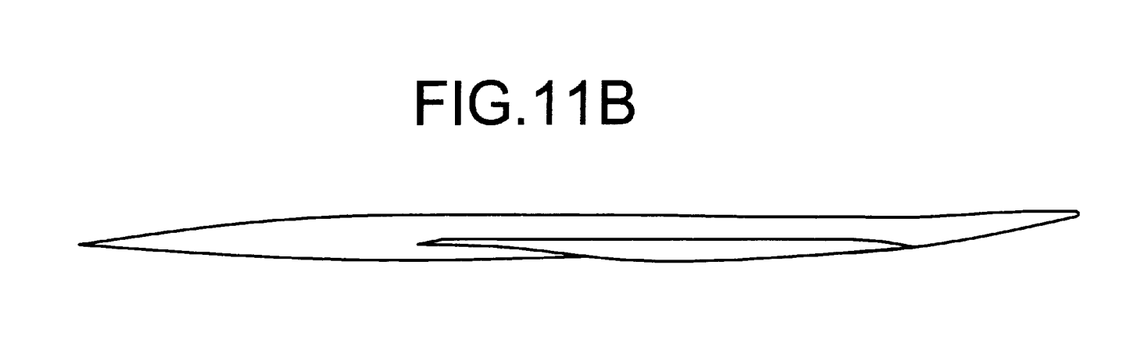
FIG. 11B is a side view of a wing/fuselage configuration with an Optimized non-waisted fuselage in accordance with the present invention.

FIGS. 11A and 11B are top and side views, respectively, of the wing/fuselage configuration with an Optimized non-waisted fuselage, '$W_O$', after the fuselage camber is optimized in accordance with the present invention. FIG. 2 shows that the Optimized total wing/fuselage cross-sectional area at $M_\infty=1.0$ is reduced slightly from the Modified design. FIG. 3 illustrates how the Optimized fuselage camber and incidence changes with respect to the Baseline/Modified designs. That is, the Optimized camber line is slightly higher than the Baseline/Modified designs forward of the formerly waisted area, and the Optimized camber line is slightly lower than the Baseline/Modified designs aft of the formerly waisted area. Recall that the Baseline camber line was re-imposed or recovered in a prior step, and thus the Baseline and Modified fuselage camber lines overlap.

In FIG. 5 the $M_\infty=2.4$ area cuts show that removing the fuselage waist does increase the total cross-sectional area for the Optimized design as expected, but that the cross-sectional area distribution remains smooth and it is slightly less than the Modified design. In FIG. 8 the $M_\infty=1.1$-cut area distributions show that the Optimized design, like the Modified design, has a smoother area distribution near FS1500 than the Baseline configuration, which has an inflection point in the curvature.

FIG. 6 shows the aerodynamic performance at the supersonic cruise point ($M_\infty=2.4, C_L=0.102$). The Optimized configuration has 1.8 counts less pressure drag ($\Delta C_{Dp}=-0.00018$) than the Baseline configuration, as compared to the Modified configuration which had 1.5 counts less drag than the Baseline configuration.

The present invention thus provides a method to obtain a fuselage with 4.6% more fuselage volume while reducing the drag at the supersonic cruise point ($M_\infty=2.4, C_L=0.102$) by 1.8 counts. In addition, the pressure drag is also reduced at the off-design conditions of $M_\infty=1.1$ and $M_\infty=0.95$.

The present invention may be applied to improve the supersonic aerodynamic performance of any airborne vehicles where there is a distinct fuselage. This includes supersonic military fighter, attack, and bomber aircraft; supersonic commercial aircraft such as the High-Speed Civil transport (HSCT); and supersonic missiles.

Although preferred embodiments of the present invention have been described in detail herein above, it should be clearly understood that many variations and/or modifications of the basic inventive concepts herein taught, which may appear to those skilled in the art, will still fall within the spirit and scope of the present invention as defined in the appended claims and their equivalents.

Having thus described our invention, what we claim as new and desire to secure by letters patent is as follows:

1. A method of designing a non-waisted fuselage for supersonic wing/fuselage configurations to increase fuselage volume and improve supersonic aerodynamic performance, said method comprising steps of:
    (A) providing a baseline fuselage configuration having a waisted cross-sectional area portion;
    (B) designating endpoints representing the waisted cross-sectional area portion;
    (C) removing the waisted cross-sectional area portion by linearly reconstructing cross-sections between the endpoints to produce a modified fuselage configuration without waisting; and
    (D) recovering a fuselage camber line of the baseline fuselage configuration to produce a fuselage camber line for the modified fuselage configuration.

2. The method of claim 1, wherein the baseline fuselage configuration of the step (A) is obtained using linear theory.

3. The method of claim 1, further comprising a step (E) of optimizing the fuselage camber line of the modified fuselage configuration to produce an optimized fuselage configuration.

4. The method of claim 2, further comprising a step (E) of optimizing the fuselage camber line of the modified fuselage configuration to produce an optimized fuselage configuration.

5. The method of claim 4, wherein the optimizing step (E) is performed after the recovering step (D).

6. The method of claim 5, wherein the optimization step (E) is performed using non-linear aerodynamic methods.

7. The method of claim 6, wherein during the designating step (B), the endpoints respectively correspond to a fuselage station forward of the waisted portion and to a fuselage station aft of the waisted portion.

8. The method of claim 7, wherein during the recovery step (D) the fuselage camber line of the modified fuselage configuration is matched to the fuselage camber line of the baseline fuselage configuration.

9. The method of claim 8, wherein after the recovery step (D) a pressure drag for the modified fuselage configuration is less than a pressure drag for the baseline fuselage configuration at a supersonic cruise speed.

10. The method of claim 8, wherein after the recovery step (D) a pressure drag for the modified fuselage configuration is less than a pressure drag for the baseline fuselage configuration at a low supersonic speed.

11. The method of claim 8, wherein after the recovery step (D) a pressure drag for the modified fuselage configuration is less than a pressure drag for the baseline fuselage configuration at a transonic cruise speed.

12. The method of claim 9, wherein after the optimizing step (E) the pressure drag for the modified fuselage configuration is reduced further.

13. The method of claim 6, wherein the optimizing step (E) is performed by applying a plurality of Hicks-Henne sine functions to perturb a length of the modified fuselage configuration.

* * * * *